Le R. S. WHITE,
Assignor to Brown & Brothers.
SPOONS AND FORKS.
No. 7,699. Reissued May 22, 1877.
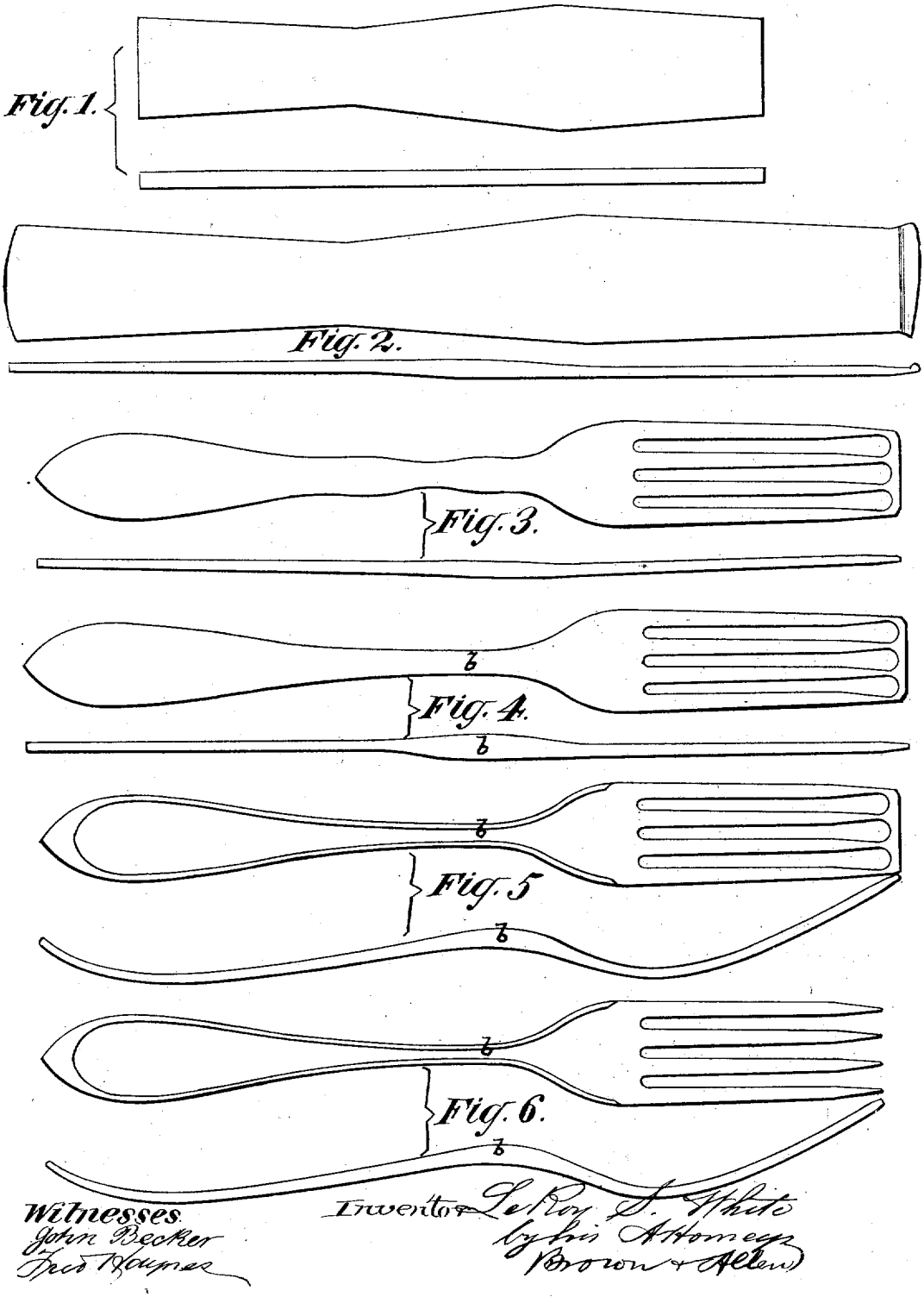
Witnesses.
John Becker
Fred Kaupner
Inventor LeRoy S. White
by his Attorneys
Brown & Allen
N. PETERS, PHOTO-LITHOGRAPHER, WASHINGTON, D. C.

UNITED STATES PATENT OFFICE

LE ROY S. WHITE, OF WATERBURY, CONNECTICUT, ASSIGNOR TO BROWN & BROTHERS, OF SAME PLACE.

IMPROVEMENT IN SPOONS AND FORKS.

Specification forming part of Letters Patent No. 180,403, dated July 25, 1876; reissue No. 7,699, dated May 22, 1877; application filed April 3, 1877.

DIVISION A.

*To all whom it may concern:*

Be it known that I, LE ROY S. WHITE, of Waterbury, in the county of New Haven and State of Connecticut, have invented a new and useful Improvement in the Manufacture of Table-Forks and Spoons, and other articles of table use, which improvement is fully set forth in the following specification and accompanying drawing.

This invention relates to the manufacture of forks, spoons, and other articles of table use, from German silver or albata and other ductile metals or alloys, in which the entire article, including its handle, is made from the same piece of metal. In the ordinary process of manufacturing such table-forks and spoons it is customary first to cut out a primary blank from a sheet of uniform thickness, and, after annealing the same, to roll it to grade by tapering it from that portion which is to form the shank toward opposite ends, and afterward to cut out from such primary blank a secondary blank having a profile of the form desired for the fork or spoon, and, after annealing such secondary blank, to stamp it while in the flat state, to produce the ornamentation, and then to bend it to the required curvature in directions perpendicular to its face. This bending of the blank has the effect of weakening the metal at the shank, where the greatest stiffness is required. This is due to the disturbance of the molecular arrangement of the metal by the act of bending, and no amount of facewise condensation of the blank prior to bending obviates this result.

My invention consists in condensing the metal in the shank of the fork, spoon, or blank by pressure in a direction perpendicular to the face of the latter after said blank has been bent, whereby any impairing of the strength of the shank by the act of bending is fully or more than compensated for by the hardness or stiffness imparted to it by the condensation of the metal after bending, as above described. This condensation of the metal in the shank by pressure in a direction perpendicular to the face of the fork, spoon, or blank, after the latter has been bent, may also be applied to advantage when pressure to condense or harden the metal in the shank has been applied in a direction transverse to the plane or face of the blank before bending, as described in Letters Patent No. 178,218, issued to Brown & Brothers, of Waterbury, Connecticut, as assignees of myself, May 30, 1876, inasmuch as condensing the metal in the shank after bending serves to restore the condensation effected previous to bending to whatever extent it may have been impaired by the bending. My invention accordingly includes this method of condensing or hardening the metal of the shank in all directions; and the accompanying drawing, to which only brief reference here need be made in further explanation of the invention, will serve to illustrate it.

Figure 1 represents face and edge views of a primary blank for a table-fork cut from a sheet of metal of uniform thickness, said figure also representing said blank after it has been annealed.

Fig. 2 represents face and edge views of said blank after it has been rolled to grade.

Fig. 3 represents face and edge views of the secondary blank cut from the graded primary blank shown in Fig. 2 as required to form the fork, also showing the same as it appears after being annealed.

Fig. 4 represents face and edge views of the graded cut-out blank shown in the immediately-preceding figure, after said blank has been further shaped and "roughed out," and after the metal in the shank has been condensed by pressure applied in a direction transverse to the plane of the blank, as described in Letters Patent No. 178,218, hereinbefore referred to, and been roughed out on a polishing-belt.

Fig. 5 represents face and edge views of said fork-blank after it has been bent to give the fork or spoon its required contour lengthwise, and after the metal of the shank has been condensed by pressure in a direction perpendicular to the face of the blank, in accordance with this invention—that is, after said blank has been bent into form—such condensation reducing the thickness of the metal at the shank *b*, as compared with that shown for it in Fig. 4, to an extent corresponding with the amount of pressure brought to bear upon the blank in a direction perpendicular to its face, after said blank has been bent. This condensation of the metal in the shank may either be done at the close of the bending operation, and by the same dies as used to effect the bending, provided the said dies are made of proper form, or it may be done by a separate and subsequent stamping operation.

Fig. 6 represents face and edge views of the finished fork.

By condensing the metal of the blank by pressure in a direction perpendicular to its face, and after bending said blank, instead of being weakened at the shank *b* by bending, is materially stiffened or strengthened, and in case of the blank having been previously condensed by pressure in a direction transverse to its plane, the full benefit of that condensation is retained, as hereinbefore described.

I claim—

1. The improvement in the art of manufacturing forks, spoons, and other like articles of table use, by condensing the metal in its shank by pressure in a direction perpendicular to the face of the fork, spoon, or blank after the latter has been bent, substantially as specified.

2. The method herein described of condensing or hardening the metal in the shank of a fork, spoon, or other like article of table use, by first applying pressure to the shank in a direction transverse to the plane or face of the blank before bending, and subsequently condensing the metal in the shank after bending, by pressure applied in a direction perpendicular to the face of the blank, essentially as and for the purpose or purposes herein set forth.

LE ROY S. WHITE.

Witnesses:
FRANK PARTREE,
PHILO BROWN.